(12) United States Patent
Coughlin et al.

(10) Patent No.: US 8,616,601 B1
(45) Date of Patent: Dec. 31, 2013

(54) ANIMAL CARCASS MOVER

(71) Applicants: Liam Coughlin, Yucaipa, CA (US);
Marc Edward Gonzales, Fontana, CA (US); Tracy Clinton Dills, Redlands, CA (US)

(72) Inventors: Liam Coughlin, Yucaipa, CA (US);
Marc Edward Gonzales, Fontana, CA (US); Tracy Clinton Dills, Redlands, CA (US)

( * ) Notice: Subject to any disclaimer, the term of this patent is extended or adjusted under 35 U.S.C. 154(b) by 0 days.

(21) Appl. No.: 13/685,258

(22) Filed: Nov. 26, 2012

(51) Int. Cl.
*A45F 5/00* (2006.01)

(52) U.S. Cl.
USPC .............................. 294/156; 294/153; 452/189

(58) Field of Classification Search
USPC .................. 294/152–153, 156, 167, 210, 15; 452/187–192; 224/157, 184, 921
See application file for complete search history.

(56) References Cited

U.S. PATENT DOCUMENTS

| 4,243,164 | A | * | 1/1981 | Burlison et al. | 294/146 |
| 4,828,307 | A | * | 5/1989 | Sokol et al. | 452/192 |
| 5,591,077 | A | * | 1/1997 | Rowe | 452/189 |
| 7,029,045 | B2 | * | 4/2006 | Tumminaro | 294/15 |
| 7,896,416 | B2 | * | 3/2011 | Carter | 294/167 |
| 2009/0233535 | A1 | * | 9/2009 | Boduch | 452/187 |

* cited by examiner

*Primary Examiner* — Stephen Vu
(74) *Attorney, Agent, or Firm* — Plager Schack LLP

(57) ABSTRACT

An animal carcass mover enables a user to drag an animal carcass without losing control of the animal carcass. The animal carcass mover comprises an expandable tube assembly mechanically coupled to strap assembly. The expandable tube assembly comprises a left large diameter tube expendably adjacent to a left medium diameter tube section, which is expendably adjacent to a center small tube section. The center small tube section is expendably adjacent to a right medium diameter tube section, which is expendably adjacent to a right large diameter tube section. The strap assembly further comprises a fixed loop end can wrap around the expandable tube assembly and a hook and loop fastener that can wrap around the expandable tube assembly and adjust for the animals of different sizes. In this manner, a user can wrap the strap assembly around an animal in order to drag the animal to a desired destination.

3 Claims, 4 Drawing Sheets

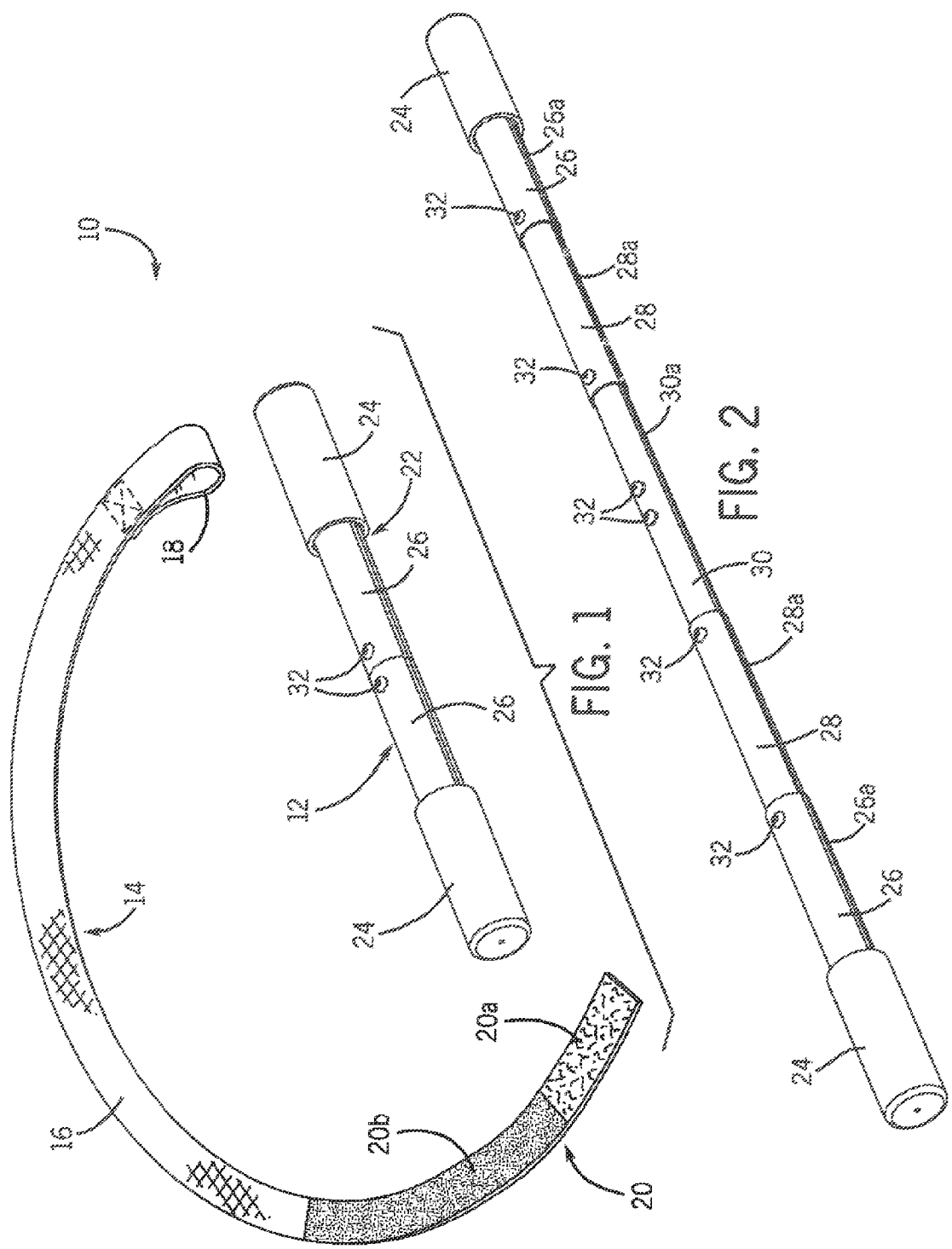

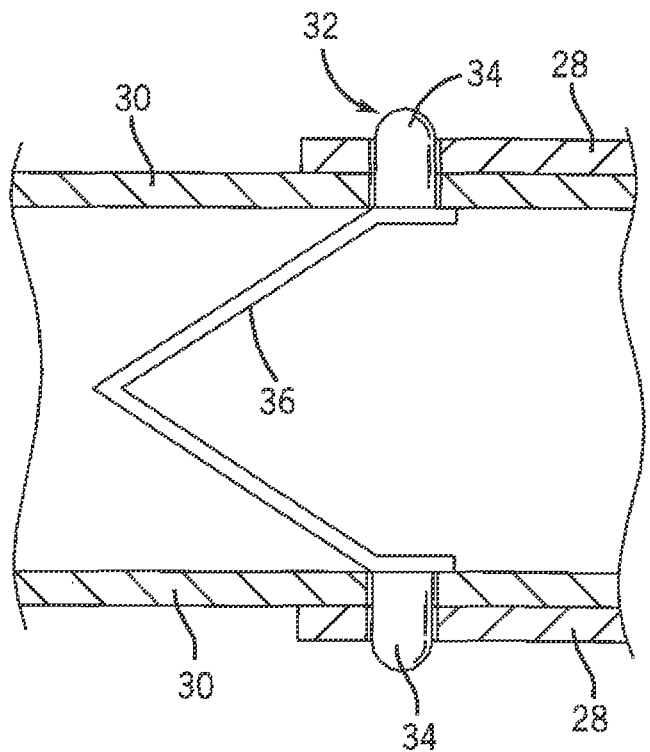
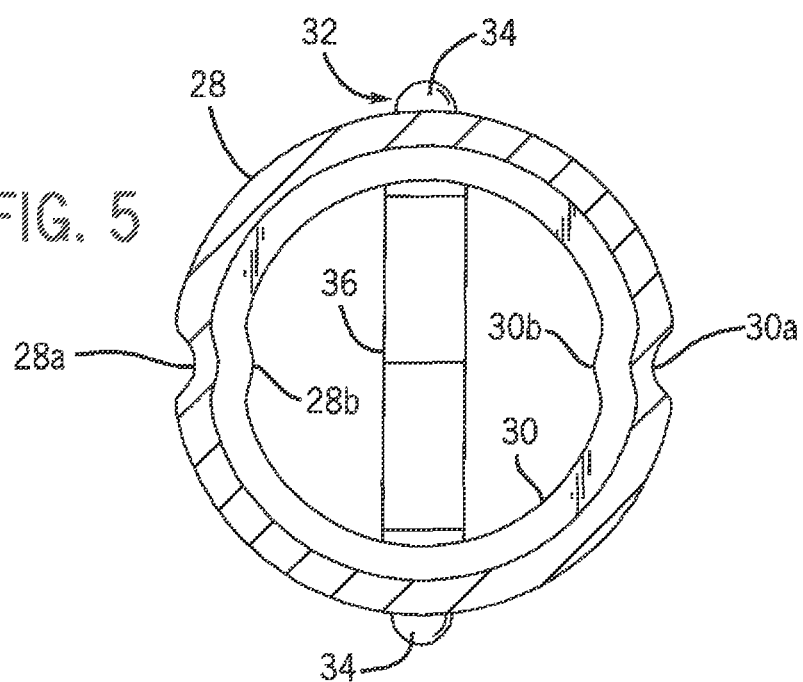

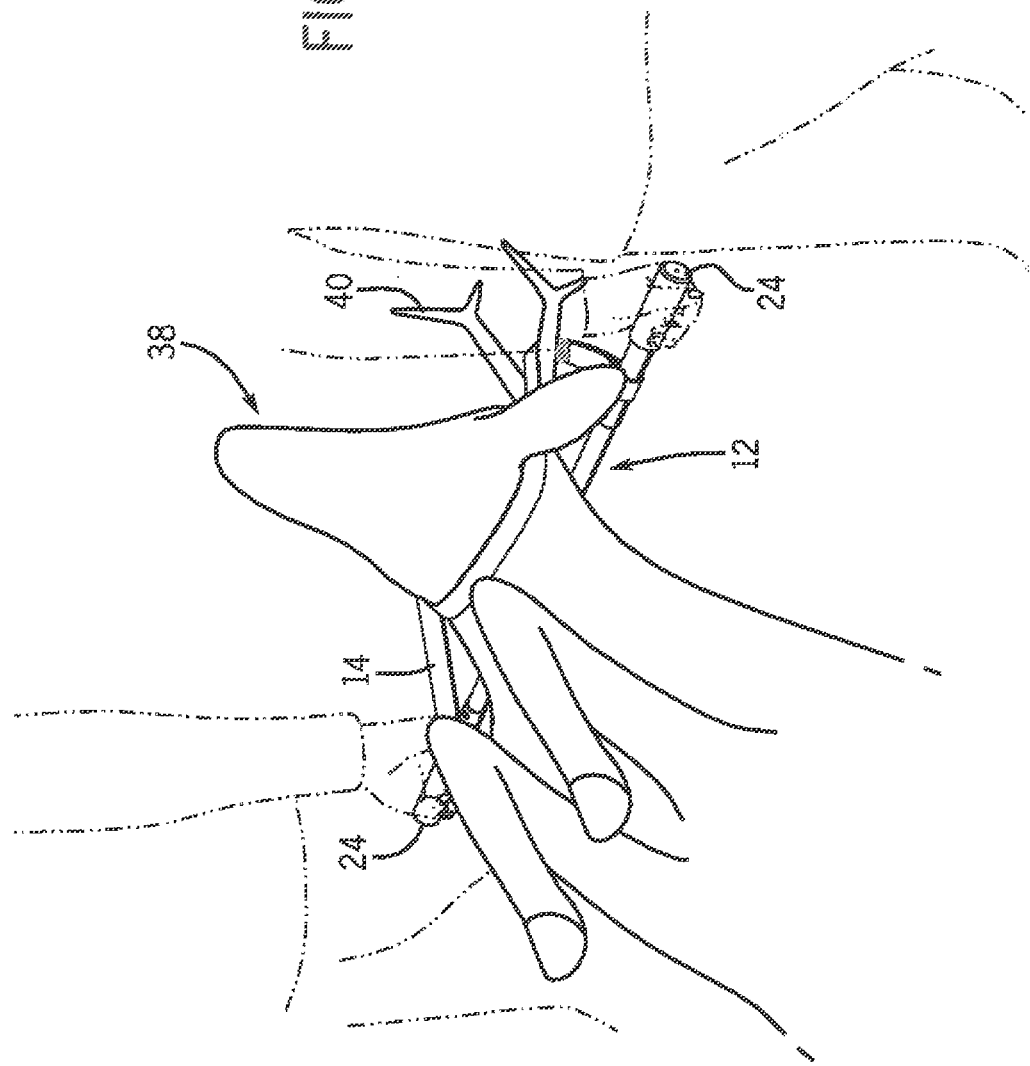

ANIMAL CARCASS MOVER

CROSS REFERENCE TO RELATED APPLICATIONS

This application claims priority to U.S. Provisional Application 61/564,694 filed on Nov. 29, 2011.

FIELD OF THE INVENTION

This invention relates to devices that maneuver a carcass or carcass portion by lifting it off of an underlying supporting surface.

BACKGROUND OF THE INVENTION

Prior to the disclosed invention there was no good solution for retrieving dead game animals, such as deer, from the hunting grounds. Many hunting areas do not allow vehicles to be driven to the dead animal. The hunter must move the animal from the field to a road were a vehicle is parked. This is challenging for several reasons. First, game animals are heavy and awkward to carry. Second, the terrain is often steep and slippery. Third, the hunter may encounter obstacles such as downed trees or creeks which are difficult to cross safely while carrying a heavy carcass. Fourth, the hunters vehicle may be parked a long distance from the dead animal. Fifth, bringing the dead animal to the vehicle can be an exhausting and dangerous process. The prior art includes, U.S. Pat. No. 4,243,164 issued to Burlison; U.S. Pat. No. 4,828,307 issued to Sokol; and U.S. Pat. No. 7,029,045 issued to Tumminaro.

Sokol comprises telescopic extension member extending out from a middle section and held in place with a spring device, a loop shaped cord is used to drag a game mammal from the neck or antlers. Sokol is too small has teaches too few expandable lengths to solve the problems listed above. Tumminaro comprises a yoke, yoke handles, an adjustment fastener, a hook, and hand grips. Tumminaro teaches that bulky rounded pieces are more efficient than expansionary pieces and teaches away from the present invention, while not solving the problems created by the prior art. Like, Tumminaro, Burlison similarly does not teach expansionary devices.

BRIEF SUMMARY OF THE INVENTION

An animal carcass mover enables a user to drag an animal carcass without losing control of the animal carcass. The animal carcass mover comprises an expandable tube assembly mechanically coupled to strap assembly. The expandable tube assembly comprises a left large diameter tube expendably adjacent to a left medium diameter tube section. The left medium diameter tube section is expendably adjacent to a center small tube section. The center small tube section is expendably adjacent to a right medium diameter tube section; the right medium diameter tube section is expendably adjacent to a right large diameter tube section. In this manner a user can expand the length of the expandable tube assembly to be able to drag animals of different sizes.

The strap assembly further comprises a fixed loop end can wrap around the expandable tube assembly and a hook and loop fastener that can wrap around the expandable tube assembly and adjust for the animals of different sizes. In this manner, a user can wrap the strap assembly around an animal in order to drag the animal to a desired destination.

BRIEF DESCRIPTION OF THE SEVERAL VIEWS OF THE DRAWINGS

Figure 3:
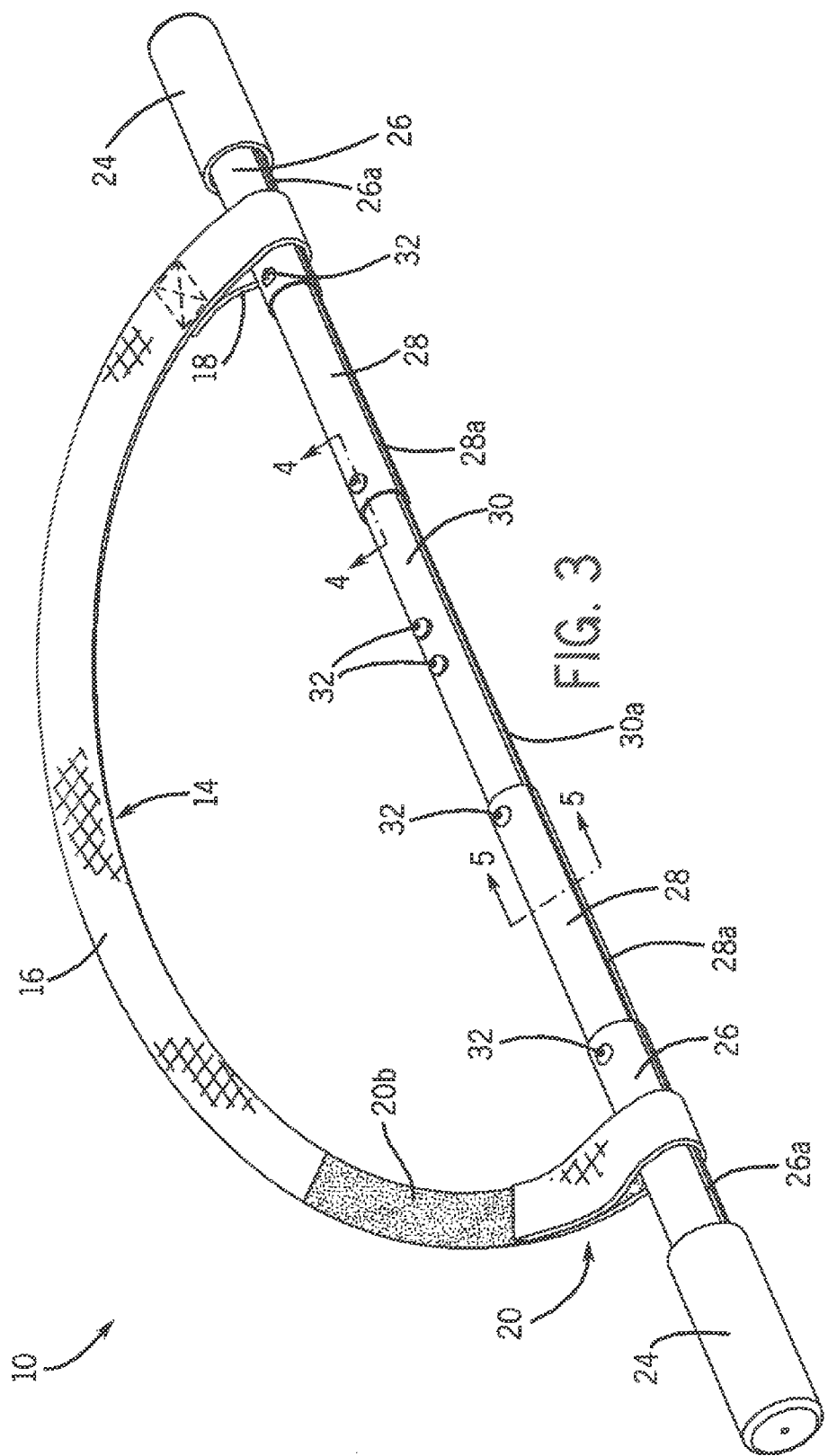

Having thus described the invention in general terms, reference will now be made to the accompanying drawings, which are not necessarily drawn to scale, and wherein:
  FIG. 1 is an exploded perspective view of the invention.
  FIG. 2 is a perspective view of the tube of the invention in an expanded configuration.
  FIG. 3 is a perspective view of the assembled invention.
  FIG. 4 is a cross-sectional view taken on line 4-4 of FIG. 3.
  FIG. 5 is a cross-sectional view taken on line 5-5 of FIG. 3.
  FIG. 6: is a perspective view showing the invention in use.

DETAILED DESCRIPTION OF THE INVENTION

Embodiments of the present invention overcome many of the obstacles associated with maneuvering animal carcasses a sustained distance, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows animal carcass mover 10 prior to use. Animal carcass mover 10 comprises expandable tube assembly 12 mechanically coupled to strap assembly 14. Strap assembly 14 comprises strap 16, which has a rounded shape comprising a first strap end and a second strap end. The first strap end is mechanically coupled to fixed loop 18. The second strap end is mechanically coupled to hook fastener 20a and loop fastener 20b to form hook and loop fastener 20. Strap assembly 14 can be affixed to tube assembly 12 as shown in more detail in FIG. 3.

FIG. 1, FIG. 2 and FIG. 5 show tube assembly 12 in more detail. Left large diameter tube section 26 comprises left large diameter tube outer alignment ridges 26a and left large diameter tube inner alignment ridges 26b. Left large diameter tube section 26 is mechanically coupled to left grip 24. Left medium diameter tube section 28 comprises left medium diameter tube outer alignment ridges 28a and left medium diameter tube inner alignment ridges 28b. Center small tube section 30 comprises center small tube outer alignment ridges 30a.

Right large diameter tube section 26 comprises right large diameter tube outer alignment ridges 26a and right large diameter tube inner alignment ridges 26b. Right large diameter tube section 26 is mechanically coupled to right grip 24. Right medium diameter tube section 28 comprises right medium diameter tube outer alignment ridges 28a and right medium diameter tube inner alignment ridges 28b.

In this manner, left large diameter tube inner alignment ridges 26b can guide left large diameter tube section 26 along left medium diameter tube outer alignment ridges 28a of left medium diameter tube section 28 allowing left large diameter tube section 26 to telescopically slide along left medium diameter tube section 28 forming collapsible tube 22. Likewise, left medium diameter tube inner alignment ridges 28b can guide left medium diameter tube section 28 along center small tube outer alignment ridges 30a of center small tube section 30 allowing left medium diameter tube section 28 to telescopically slide along center small tube section 30.

Additionally, right large diameter tube inner alignment ridges 26b can guide right large diameter tube section 26 along right medium diameter tube outer alignment ridges 28*a* of right medium diameter tube section 28 allowing right large diameter tube section 26 to telescopically slide along right medium diameter tube section 28. Likewise, right medium diameter tube inner alignment ridges 28*b* can guide right medium diameter tube section 28 along center small tube outer alignment ridges 30*a* of center small tube section 30 allowing right medium diameter tube section 28 to telescopically slide along center small tube section 30.

Left large diameter tube section 26 can be locked into place at a left end of left medium diameter tube section 28 with first left quick-release button connector 32. Left large diameter tube section 26 can be locked into place at a right end of left medium diameter tube section 28 and a left end of center small tube section 30 with second left quick-release button connector 32. Left large diameter tube section 26 can be locked into place at a right end of left medium diameter tube section 28 and a left center point of center small tube section 30 with third left quick-release button connector 32.

Similarly, right large diameter tube section 26 can be locked into place at a right end of right medium diameter tube section 28 with first right quick-release button connector 32. Right large diameter tube section 26 can be locked into place at a left end of right medium diameter tube section 28 and a right end of center small tube section 30 with second right quick-release button connector 32. Right large diameter tube section 26 can be locked into place at a left end of right medium diameter tube section 28 and a right center point of center small tube section 30 with third right quick-release button connector 32.

FIG. 3 shows animal carcass mover 10 assembled where expandable tube assembly 12 mechanically coupled to strap assembly 14. This has many advantages over the prior art. First, Sokol teaches away from the presences of ridges. Ridges make expandable tube assembly 12 resistant to turning which can cause twisting in strap assembly 14 or make navigating difficult terrain more challenging. Second, Sokol teaches away from multiple expansionary sections. The presence of multiple expansionary sections enables a user to haul large game a longer distance because the sections are sufficiently wide enough to fit around antlers of a deer as shown in FIG. 6. Sokol teaches that a smaller device is more portable, while this is true; Sokol lacks the five-member expansionary section which is necessary to accommodate animals of different sizes. The flexibility of the size of expandable tube assembly 12 is provided by quick-release button connectors 32, which are not found in the prior art and are shown in more detail in FIG. 5.

FIG. 4 shows the operation of quick-release button connector 32 in more detail. Quick-release button connector 32 comprises spring 36 mechanically coupled to upper button 34 and lower button 34. As center small tube section 30 slides immediately adjacent to medium diameter tube section 28, eventually an upper cavity in center small tube section 30 will align with an upper cavity in medium diameter tube section 28 while a lower cavity in center small tube section 30 will align with a lower cavity in medium diameter tube section 28, this causes upper button 34 to slide through the upper cavities and lower button 34 to slide through the lower cavities due to the tension created by spring 36. This enables quick-release button connector 32 to temporarily affix center small tube section 30 to medium diameter tube section 28. This enables a user to lock the left large diameter tube section 26, the left medium diameter tube section 28 the center small tube section 30, the right medium diameter tube section 28, and the right large diameter tube section 26 into a user determined position that prevents telescoping components from moving outside of the user's desire.

FIG. 6 shows how to use animal carcass mover 10. As noted above, animal carcass mover 10 comprises expandable tube assembly 12 mechanically coupled to strap assembly 14 as shown in FIG. 3. A user can wrap strap assembly 14 around antlers 40 of animal 38 and then under the ears of animal 38 and around the neck of animal 38. As pictured, two users can easily drag a very large animal 38 by holding left grip 24 and right grip 24 in order to drag the animal to a desired destination.

The invention claimed is:

1. An animal carcass mover enables a user to drag an animal carcass without losing control of the animal carcass, the animal carcass mover comprises,
   an expandable tube assembly mechanically coupled to strap assembly;
   the expandable tube assembly comprises a left large diameter tube section expendably adjacent to a left medium diameter tube section; the left medium diameter tube section comprises left medium diameter tube inner alignment ridges and is expendably adjacent to a center small tube section comprising center small tube outer alignment ridges; the center small tube section is expendably adjacent to a right medium diameter tube section comprising right medium diameter tube inner alignment ridges; the right medium diameter tube section is expendably adjacent to a right large diameter tube section; in this manner the user can expand a length of the expandable tube assembly to be able to drag animals of different sizes;
   the strap assembly further comprises a fixed loop end can wrap around the expandable tube assembly and a hook and loop fastener that can wrap around the expandable tube assembly and adjust for the animals of different sizes;
   in this manner, the user can wrap the strap assembly around an animal in order to drag the animal to a desired destination.

2. An animal carcass mover enables a user to drag an animal carcass without losing control of the animal carcass, the animal carcass mover comprises,
   an expandable tube assembly mechanically coupled to strap assembly;
   the expandable tube assembly comprises a left large diameter tube section expendably adjacent to a left medium diameter tube section; the left medium diameter tube section is expendably adjacent to a center small tube section; the center small tube section is expendably adjacent to a right medium diameter tube section; the right medium diameter tube section is expendably adjacent to a right large diameter tube section; in this manner the user can expand a length of the expandable tube assembly to be able to drag animals of different sizes;
   the strap assembly further comprises a fixed loop end can wrap around the expandable tube assembly and a hook and loop fastener that can wrap around the expandable tube assembly and adjust for the animals of different sizes;
   the left large diameter tube section comprises left large diameter tube outer alignment ridges and left large diameter tube inner alignment ridges; the left medium diameter tube section comprises left medium diameter tube outer alignment ridges and left medium diameter tube inner alignment ridges; the center small tube section comprises center small tube outer alignment ridges;

the right large diameter tube section comprises right large diameter tube outer alignment ridges and right large diameter tube inner alignment ridges; the right medium diameter tube section comprises right medium diameter tube outer alignment ridges and right medium diameter tube inner alignment ridges;

in this manner, the left large diameter tube inner alignment ridges can guide the left large diameter tube section along the left medium diameter tube outer alignment ridges of the left medium diameter tube section allowing the left large diameter tube section to telescopically slide along the left medium diameter tube section;

further, the left medium diameter tube inner alignment ridges can guide the left medium diameter tube section along the center small tube outer alignment ridges of the center small tube section allowing the left medium diameter tube section to telescopically slide along the center small tube section;

further, the right large diameter tube inner alignment ridges can guide the right large diameter tube section along the right medium diameter tube outer alignment ridges of the right medium diameter tube section allowing the right large diameter tube section to telescopically slide along the right medium diameter tube section further, the right medium diameter tube inner alignment ridges can guide the right medium diameter tube section along the center small tube outer alignment ridges of the center small tube section allowing the right medium diameter tube section to telescopically slide along the center small tube section;

this makes the expandable tube assembly resistant to turning which can cause twisting in the strap assembly or make navigating difficult terrain more challenging.

3. An animal carcass mover enables a user to drag an animal carcass without losing control of the animal carcass, the animal carcass mover comprises, an expandable tube assembly mechanically coupled to strap assembly;

the expandable tube assembly comprises a left large diameter tube section expendably adjacent to a left medium diameter tube section; the left medium diameter tube section is expendably adjacent to a center small tube section; the center small tube section is expendably adjacent to a right medium diameter tube section; the right medium diameter tube section is expendably adjacent to a right large diameter tube section; in this manner the user can expand a length of the expandable tube assembly to be able to drag animals of different sizes;

the strap assembly further comprises a fixed loop end can wrap around the expandable tube assembly and a hook and loop fastener that can wrap around the expandable tube assembly and adjust for the animals of different sizes;

the left large diameter tube section can be locked into place at a left end of the left medium diameter tube section with a first left quick-release button connector; the left large diameter tube section can be locked into place at a right end of the left medium diameter tube section and a left end of the center small tube section with a second left quick-release button connector; the left large diameter tube section can be locked into place at a right end of the left medium diameter tube section and a left center point of the center small tube section with a third left quick-release button connector;

the right large diameter tube section can be locked into place at a right end of the right medium diameter tube section with a first right quick-release button connector; the right large diameter tube section can be locked into place at a left end of the right medium diameter tube section and a right end of the center small tube section with a second right quick-release button connector; the right large diameter tube section can be locked into place at a left end of the right medium diameter tube section and a right center point of the center small tube section with third right quick-release button connector;

this enables the user to lock the left large diameter tube section, the left medium diameter tube section the center small tube section, the right medium diameter tube section, and the right large diameter tube section into a user determined position that prevents telescoping components from moving outside of a user's desire.

\* \* \* \* \*